United States Patent [19]
Sumser et al.

[11] Patent Number: 5,943,864
[45] Date of Patent: Aug. 31, 1999

[54] EXHAUST GAS TURBOCHARGER FOR AN INTERNAL COMBUSTION ENGINE

[75] Inventors: Siegfried Sumser, Stuttgart; Erwin Schmidt, Baltmannsweiler; Helmut Finger, Leinfelden-Echterdingen; Hong Son Truong, Ostfildern, all of Germany

[73] Assignee: Mercedes-Benz A.G., Stuttgart, Germany

[21] Appl. No.: 08/851,242

[22] Filed: May 5, 1997

[30] Foreign Application Priority Data

May 7, 1996 [DE] Germany .......................... 196 18 160

[51] Int. Cl.⁶ ...................................................... F02B 37/18
[52] U.S. Cl. ............................................. 60/602; 60/605.2
[58] Field of Search ..................... 60/602, 605.2

[56] References Cited

U.S. PATENT DOCUMENTS

| | | |
|---|---|---|
| 4,224,794 | 9/1980 | Woollenweber ........................ 60/602 |
| 5,046,317 | 9/1991 | Satokawa .................................. 60/602 |
| 5,146,754 | 9/1992 | Jain et al. ................................. 60/602 |

FOREIGN PATENT DOCUMENTS

| | | |
|---|---|---|
| 28 55 687 | 6/1979 | Germany . |
| 29 41 704 | 4/1980 | Germany . |
| 29 01 041 | 7/1980 | Germany . |
| 29 39 152 | 4/1981 | Germany . |
| 35 28 225 | 2/1986 | Germany . |
| 42 35 794 | 10/1993 | Germany . |
| 996 055 | 6/1965 | United Kingdom . |
| 1 278 903 | 6/1972 | United Kingdom . |
| 2 038 940 | 7/1980 | United Kingdom . |

*Primary Examiner*—Michael Koczo
*Attorney, Agent, or Firm*—Klaus J. Bach

[57] ABSTRACT

In an exhaust gas turbocharger for an internal combustion engine with a turbine casing including a turbine inlet structure with two flow passages separated by a partition, a turbine control valve is arranged in the partition and is in communication with a turbine bypass flow passage, which is disposed in the partition and extends to the turbine outlet for discharging exhaust gases from at least one of the two turbine inlet flow passages to the turbine outlet under the control of the turbine bypass valve.

7 Claims, 2 Drawing Sheets

FIG.1

EXHAUST GAS TURBOCHARGER FOR AN INTERNAL COMBUSTION ENGINE

BACKGROUND OF THE INVENTION

The invention relates to an exhaust gas turbocharger for an internal combustion engine having a turbine with a housing including at least two inlet passages and a bypass channel extending from at least one of the turbine inlet passages and including a bypass valve to permit discharge of exhaust gases.

DE 29 01 041 discloses such an exhaust gas turbocharger with a turbine which has a rotor and a turbine casing with two inlet passages separated by a partition. A bypass passage, in which a bypass valve is arranged, branches off from one of the two inlet passages. By means of the bypass passage including the bypass valve, exhaust gas can be branched off from the turbine inlet passage and can be fed back into the exhaust gas line downstream of the turbine.

For the general technical background, reference is further made to the publications DE 42 35 794 C1, DE 35 28 225 A1, DE 29 41 704 C2 and DE 28 55 687 C2.

A problem of exhaust gas turbochargers lies in the fact that, for a long service life, critical temperature and pressure condition values must be maintained especially in the upper load range. So-called blow-off devices, for example, axial slide valves, represent a known remedy, by which the contour of the turbine casing can be changed in the region of the inlet-side rotor periphery and a partial flow of the exhaust gas past the turbine rotor is made possible. The turbine-side exhaust gas throughput can be suddenly increased in that a certain amount of exhaust gas is not conducted through the turbine rotor, where it would perform work, but rather is conducted past the rotor. For double flow exhaust gas turbochargers, two blow-off devices may be necessary for their reliable operation.

A further problem for turbocharged internal combustion engines, the supercharges of which are optimally configured with regard to consumption, is that, in relevant characteristic ranges of the internal combustion engine, the supercharging pressure is higher than the exhaust gas back pressure of the engine, and thus simple recycling of the exhaust gas to the in-take side of the internal combustion engine is not possible. In order, nevertheless, to be able to supply exhaust gas to the intake air stream so as to reduce the $NO_x$ emissions, the air flow downstream of the charge air compressor is in many cases again throttled down to a pressure below the exhaust gas back pressure using a throttle valve. Exhaust gas is not normally admitted upstream of the charge air compressor in order to avoid contamination of the compressor and also contamination of a downstream charge air cooler, since such contamination would result in a significantly reduced service life of these components.

It is the object of the invention to provide a two-or multi-flow exhaust gas turbocharger which is structurally simple and cost-effective and which permits a control of pressure in the various flow passages.

SUMMARY OF THE INVENTION

In an exhaust gas turbocharger for an internal combustion engine with a turbine casing including a turbine inlet structure with two flow passages separated by a partition, a turbine bypass valve with a turbine bypass flow passage is disposed in the partition and the turbine bypass flow passage extends to the turbine outlet for discharging exhaust gases from at least one of the two turbine inlet flow passages to the turbine outlet under the control of the turbine bypass valve.

One advantage of the exhaust gas turbocharger according the to the invention lies in the fact that the pressure buildup in the individual flow passages can be accurately controlled by means of a bypass valve arranged in the partition between the two flow passages. A control valve in the turbine inlet region inside the partition can be variably adjusted or intermittently controlled and, depending on the position of the control valve, permits simultaneous release of gas from both flow passages, release of gas from only one flow passage, no release of gas while providing a connection between the two flow passages, or while keeping the two flow passages seperated. During blow off operation of the turbine, the quantity of exhaust gas released is returned to the exhaust gas stream downstream of the turbine rotor.

A section of the bypass passage may be formed in the partition and preferably includes openings to provide for communication between the inlet passages which can be controlled by a valve structure of the control valve. Such a bypass passage can be cast with the turbine housing in a simple and inexpensive manner.

Preferably the inlet flow passages of the turbine have different flow cross-sections and are connected to the exhaust ducts of one or several cylinders of the engine. An exhaust gas recirculation line branches off the turbine inlet flow passage with the smaller flow cross-section for supplying exhaust recirculation gas to the charge air duct of the engine. Then the control valve permits the supply of an accurately meterable recirculation flow of exhaust gas from the turbine inlet passage to the charge air intake duct of the engine. For example, if in the case of a six cylinder engine, the exhaust gas from three cylinders is supplied to each turbine inlet flow passage, a higher exhaust gas back pressure is formed in front of the turbine inlet having the smaller flow passage cross-section than in the turbine inlet flow passage having the larger flow cross-section. The exhaust gas recirculation line can then conduct the flow with the higher pressure to the charge air intake duct of the internal combustion engine. The pressure in, and the pressure differential between, the individual flow passages can be varied using the bypass valve arranged in the partition, so that the exhaust gas recirculation can be controlled more accurately than with conventional double-flow turbine casings.

It is particularly advantageous for turbine casings with approximately symmetrical flows (equal flow cross-sections of the turbine inlet passages) if the flow passages are in communication with a collection chamber which receives the exhaust gases from the engine cylinders. One of the flow passages then includes a flow controller and the exhaust gas recirculation line is connected to the other flow passage for supplying the recirculated exhaust gas to the charge air intake duct. In this case, the exhaust gases from the internal combustion engine are first collected in the collection chamber, from which separate connecting lines lead to the turbine inlet flow passages. According to the invention, a flow quantity regulating device is arranged in one of the connecting lines, by means of which a coarse matching with regard to the desired buildup pressure can be undertaken. Accurate matching with regard to the desired pressure gradient can then take place using the control valve according to the invention, in that either a certain amount of exhaust gas is blown off or alternatively is fed into the other turbine inlet flow passage, or the control valve is completely closed so that there is neither a blow-off of a quantity of exhaust gas nor an influx of exhaust gas into the other turbine inlet flow passage.

The invention is explained in greater detail below on the basis of the accompanying drawings.

DESCRIPTION OF PREFERRED EMBODIMENTS

Figure 1:
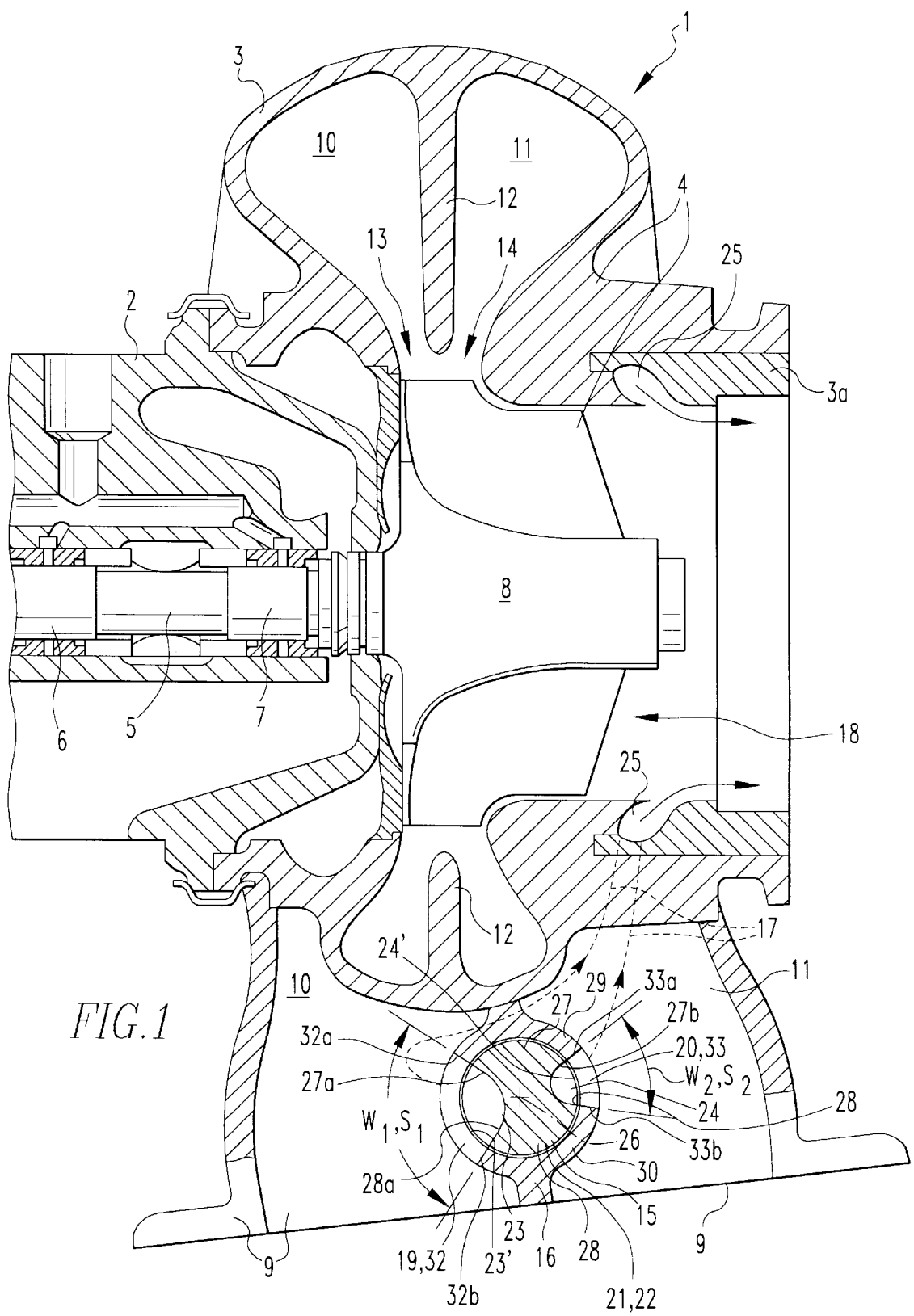
FIG. 1 shows, in an axial cross-sectional view, a two-flow passage turbine casing of an exhaust turbocharger having a control valve arranged in a partition between the two flow passages.

FIG. 1 shows in a vertical axial cross-sectional view, an exhaust gas turbocharger 1 for an internal combustion engine 34 (cf. FIGS. 2 and 3), which turbocharger comprises a bearing housing 2 and a turbine casing 3 of an exhaust gas turbine 4. A shaft 5 is supported by the bearing housing 2 in bearings 6, 7 and connected in a rotationally fixed manner to a rotor 8 of the turbine 4 and to a charge air compressor 53 (cf. FIGS. 2 and 3).

The turbine casing 3 has an exhaust gas admission structure 9 from which two spiral inlet passages 10 and 11, separated from one another by a partition 12 guide the exhaust gas through annular nozzles 13 and 14 to the turbine rotor 8. The partition 12 extends from the inlet passages 10, 11 into the admission structure 9 forming there a section 16.

A control valve 15 is arranged in the section 16 of the partition 12 and a bypass passage 17 indicated schematically by the dashed lines extends therefrom to a turbine outlet 18. The control valve 15 which is disposed upstream of the annular nozzles 13, 14 is so designed that it is possible to alternatively establish or interrupt a flow path from the inlet passage 10 or 11 or both inlet passages 10, 11 to the turbine outlet 18.

The section 16 of the partition 12 takes the shape of a cylindrical housing which is formed by the partition 12 itself. Openings 19, 20 are arranged in the section 16 for the purpose of providing communication between the inlet passages 10, 11 and the bypass passage 17 which actually extends through the section 16 of the partition and leads to the turbine. In this way, it is possible to control the flow communication between the inlet passages 10, 11 and the bypass passage 17 by means of a valve structure 21 controlling the openings 19, 20.

In the example shown, the valve structure 21 is designed as a cylinder-like rotary spool valve 22 which has flow passages 23, 24 which can be brought into alignment with the openings 19, 20. The flow passages 23, 24 extend in the longitudinal direction of the section 16 and allow for communication between the openings 19, 20 and the bypass passage 17.

The structure and the operation of the control valve 15 are explained in greater detail below.

Downstream of the exhaust gas admission structure 9 of the turbine 4, the bypass passage 17, in particular in the section 16, extends initially approximately tangentially to the periphery of the turbine casing 3 within the section 16 of the partition 12. The bypass passage 17 then extends approximately radially inwardly to the turbine outlet 18 where the bypass passage 17 opens into an annular passage 25 which is formed in the turbine casing 3 at the turbine outlet 18 and from which the exhaust gas emerges approximately parallel to the main direction of flow of the exhaust gas discharged from the turbine rotor 8. The annular passage 25 is formed by the turbine casing 3 and an insert sleeve 3a which is arranged on the rotor outlet side in the turbine casing 3.

Fitted in the cylindrical section 16, which is formed by the partition 12, is the likewise cylindrical rotary spool valve 22, which can be installed and removed for example via a tangential bore opening into the bypass passage 17 in the turbine casing 3. Following installation of the rotary spool valve 22, this tangential bore is sealed and may simultaneously serve as a support structure for an actuation lever (not shown) of the rotary spool valve 22.

The rotary spool valve 22 can be rotated about an axis of rotation 26 extending tangentially with respect to the peripheral direction of the turbine casing 3. It includes two flow passages 23, 24 which extend in the longitudinal direction thereof, are situated approximately opposite one another, and can be brought into alignment with the openings 19, 20 arranged in the section 16 of the partition 12. With respect to the axis of rotation 26, the passage walls of the flow passage 23 have an opening angle $w_1$ of about 90° and the passage walls of the flow passage 24 have an opening angle $w_2$ of about 45°. The walls of the flow passages 23, 24 extend directly up to the cylindrical walls of the rotary spool valve 22, so that a corresponding inflow cross-section 23' and 24', respectively, is formed. The depth of the passage is in each case approximately half the radius of the cylindrical rotary spool valve 22.

Between the passages 23, 24, the spool has sectors 27, 28 which are also situated opposite one another and have control edges 27a, 27b and 28a, 28b, respectively.

The rotary spool valve 22 is guided by means of the spool sectors 27 and 28 supported by wall portions 29, 30 of the section 16.

The openings 19 and 20 of the section 16, which is designed as a cylindrical sleeve, are in the form of a cylinder ring sector 32 and 33, respectively, the opening angles $s_1$ and $s_2$ of the cylinder ring sectors 32 and 33 corresponding to the opening angles $w_1$ and $w_2$ of the flow passages 23 and 24, respectively, ($s_1=w_1$; $s_2=w_2$). The cylinder ring sectors 32 and 33 have control edges 32a, 32b and 33a, 33b, respectively.

In the position shown in FIG. 1 of the rotary spool valve 22, the two turbine inlet passages 10, 11 are sealed off from one another, so that there is no flow connection between the two flow passages 10, 11. In this position of the spool valve, a certain quantity of exhaust gas can be conducted from each of the two inlet passages 10, 11 through the bypass passage 17, to the turbine outlet 18. By rotation of the rotary spool valve 22 by about 45° in the clockwise direction from this initial position, the flow passage 24 is covered by the sleeve wall of the section 16, whereby communication between bypass passage 17 and the turbine inlet passage 11 is interrupted. The control edge 27b of the spool sector 27 thus bears flush against the control edge 33b of the cylinder ring sector 33 or sweeps over the latter, so that there is no flow communication between the inflow cross-section 24' and the opening 20. However, because of the larger opening angle $s_1$ of the cylinder ring sector 32, there is still a flow communication between the inlet passage 10 and bypass passage 17.

If the rotary spool valve is rotated by another 45° in the clockwise direction, the control edge 28a of the spool sector 28 moves past the control edge 32a of the cylinder ring sector 32, whereby the flow communication between the inflow cross-section 23' and the opening 19 is also interrupted. Both flow passages 23, 24 are now covered by the sleeve wall of the section 16, so that there is no flow communication between the inlet passages 10, 11 and the bypass line 17. In this position of the rotary spool valve 22, the entire volume of exhaust gas flows through the rotor 8 of the turbine 4.

Figure 2:
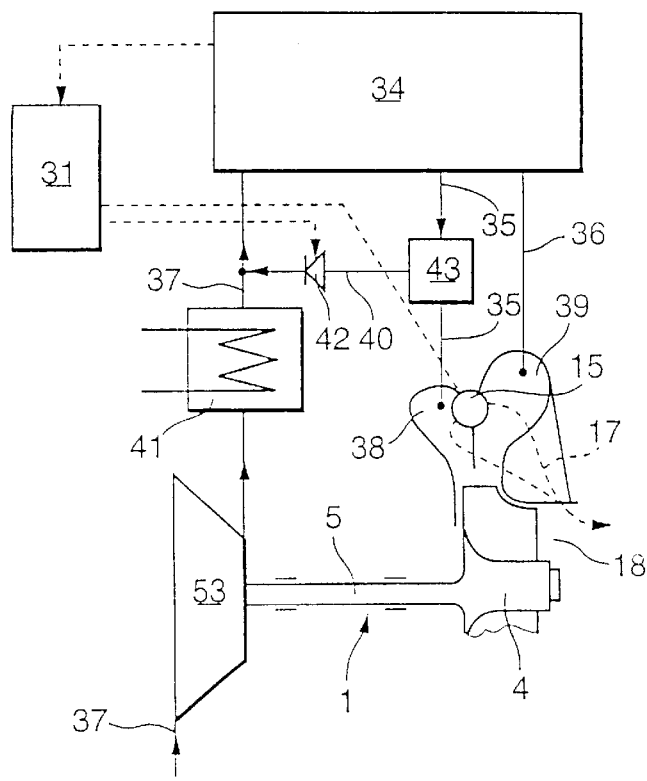
FIG. 2 is a diagrammatic representation of an internal combustion engine, which is connected via two exhaust gas line and a charge air duct to an exhaust gas turbocharger having two asymmetric inlet passages, with an exhaust gas recirculation line extending between one of the two exhaust gas passages and the charge air duct.

FIG. 2 illustrates, in a diagrammatic view, the internal combustion engine 34 which has for example six cylinders and is connected, via two exhaust gas lines 35, 26 and a charge air duct 37, to the exhaust gas turbocharger 1. The exhaust gas turbine 4 of the turbocharger 1 has two asymmetric inlet passages 38, 39, the inlet passage 38 having a smaller flow cross-section than the inlet passage 39 and an exhaust gas recirculation line 40 branching off from the exhaust gas line 35 for recirculating exhaust gas to the charge air duct 37. The exhaust gas recirculation line 40 is connected to the turbine inlet passage 38 having the smaller flow cross-section, and extends to the charge air duct downstream of an intercooler 41. An exhaust gas recirculation valve 42 (non-return valve) is arranged in the exhaust gas recirculation line 40, which valve, like the control valve 15, is controlled by means of a valve control unit 31, which is connected to an engine management system.

In the example shown, the exhaust gas flows from three cylinders of the internal combustion engine 34 are combined in the exhaust gas line 35 and the exhaust gas from the other three cylinders is combined in the exhaust gas line 36, so that a group of exhaust gas passages from a number (3) of the cylinders is assigned to each inlet passage 10 and 11.

A tank forming a surge chamber 43 for compensating pressure fluctuations, which are generated upon opening and closing of the exhaust gas recirculation valve 42 and when actuating the control valve 15, is provided in the exhaust gas line 35.

Identical reference symbols are used for identical or similar components of FIG. 1.

Figure 3:
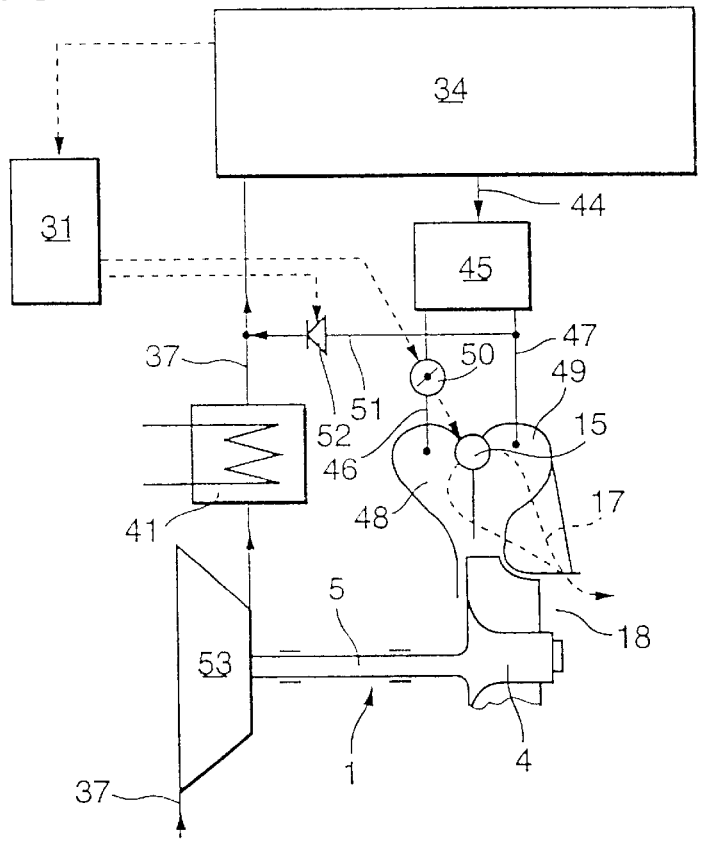
FIG. 3 is a diagrammatic representation similar to that of FIG. 2, but with symmetrical turbine inlet passages and with a collection chamber which is connected by means of two connecting lines to the flow passages of the exhaust gas turbine, and a line for recirculating exhaust gas to the charge air intake duct of the internal combustion engine.

FIG. 3 is a diagrammatic view of the six-cylinder internal combustion engine 34, which has an exhaust gas line 44 common to all the cylinders leading to an exhaust gas collection chamber 45. Two connecting lines 46, 47 lead from this exhaust gas collection container to two symmetrical turbine inlet passages 48, 49 having approximately the same flow cross-section. Identical reference symbols are used for identical or similar components shown in FIGS. 1 and 2.

A flow quantity control device 50, which is controlled by means of the valve control unit 31, is arranged in the connecting line 46. A line 51 for recirculating exhaust gas to the charge air duct 37 leads from the connecting line 47 to the charge air duct 37 downstream of the intercooler 41. An exhaust gas recirculation valve 52 (non-return valve) is arranged in the exhaust gas recirculation line 51, which valve, like the control valve 15 and the flow quantity control device 50, is controlled by means of the control unit 31, which is connected to the engine management system.

In a further configuration of the invention, the bypass valve may also be designed such that, in a specific position, the two flow passages are in communication with one another without blow-off.

In a particular configuration of the invention, it is possible, in addition, to provide for a flow connection between the turbine inlet passages by means of the bypass valve, provided the valve is appropriately designed and the flow passages are appropriately positioned with respect to the openings in the section 16.

Depending on the number of cylinders of the internal combustion engine and the desired exhaust gas pressure build up characteristics of the exhaust gas turbine, the exhaust gas from a greater or smaller number of cylinders may by combined and conducted to particular turbine inlet passages.

What is claimed is:

1. An exhaust gas turbocharger for an internal combustion engine including a turbine with a turbine casing and a rotor disposed in said turbine casing, said turbine casing having at least two turbine inlet passages which are separated by a partition, a turbine bypass passage formed in said partition and including a control valve in communication with a branch-off line extending to a turbine outlet for removing exhaust gas from at least one of said turbine inlet passages, said control valve being capable of alternatively establishing and interrupting flow communication between one of the two turbine inlet passages or both inlet passages simultaneously and said turbine bypass passage.

2. An exhaust gas turbocharger according to claim 1, wherein a section of said turbine bypass passage formed by said partition includes openings for providing said communication between said turbine inlet passages and said control valve, said control valve comprising a closure element cooperating with said openings for controlling the flow communication between said turbine inlet passages and said turbine bypass passage.

3. An exhaust gas turbocharger according to claim 2, wherein said section of said turbine bypass passage comprises a cylindrical sleeve and said control valve includes a rotary spool, said rotary spool having flow passages which can be brought into alignment with openings in said sleeve.

4. An exhaust gas turbocharger according to claim 1, wherein said turbine inlet passages have a different flow cross-section and a group of exhaust pipes from at least two cylinders of the internal combustion engine is combined and connected to each turbine inlet passage and an exhaust gas recirculating line which is connected to a charge air intake duct of the internal combustion engine branches off the inlet passage having the smaller flow cross-section.

5. An exhaust gas turbocharger according to claim 1, wherein said two turbine inlet passages have approximately the same flow cross-section and are connected via a connecting line to a collection chamber in which the exhaust gases of the internal combustion engine are collected, a flow quantity regulating device is arranged in one of the connecting lines and an exhaust gas recirculation line extends between the other of said connecting lines and said charge air intake duct.

6. An exhaust gas turbocharger according to claim 1, wherein said turbine bypass passage extends to an annular passage which is formed in the turbine casing at the turbine outlet and from which the exhaust gas emerges approximately parallel to the main direction of flow of the exhaust gas flowing out of said rotor.

7. An exhaust gas turbocharger according to claim 1, wherein said control valve is connected to a valve control unit controlling said valve as a function of operating parameters of the internal combustion engine.

\* \* \* \* \*